Jan. 12, 1960

D. F. HASTINGS ET AL

DATA CONVERTER 2,921,204

Filed Dec. 16, 1957

3 Sheets-Sheet 1

INVENTORS
DONALD F. HASTINGS
JOHN B. VENEZIA
PHILEMON A. WALLACE
BY
ATTORNEY

INVENTORS
DONALD F. HASTINGS
JOHN B. VENEZIA
PHILEMON A. WALLACE
BY [signature]
ATTORNEY Jan. 12, 1960 D. F. HASTINGS ET AL 2,921,204

DATA CONVERTER

Filed Dec. 16, 1957 3 Sheets-Sheet 3

INVENTORS
DONALD F. HASTINGS
JOHN B. VENEZIA
PHILEMON A. WALLACE
BY [signature]
ATTORNEY United States Patent Office 2,921,204
Patented Jan. 12, 1960

2,921,204

DATA CONVERTER

Donald F. Hastings, Suffern, N.Y., and John B. Venezia, Leonia, and Philemon A. Wallace, Bloomfield, N.J., assignors to Bendix Aviation Corporation, Teterboro, N.J., a corporation of Delaware Application December 16, 1957, Serial No. 702,861

6 Claims. (Cl. 250—219)

The invention relates to data converters and more particularly to converters for converting analog information to digital form.

Data converters for converting analog information to digital form usually use one of the binary codes to yield the digital information, since this requires only simple on-off switching to provide the two stable states. The desired binary code appears as transparent and opaque portions on a rotating member, such as a disc or drum, and a light source and photosensitive cells are used for switching. Converters of this kind require relatively little torque to move the rotating member. However, for proper operation, it is necessary that the light source and photocells be accurately aligned with the code pattern on the drum.

The main object of the present invention, therefore, is to provide a method and means for accurately aligning the light source, the code pattern and the photocells.

Another object is to provide apparatus so that one relatively inexperienced can rapidly make the aligning adjustments.

The invention contemplates a converter for converting information from one form to another and having a plurality of photocells, a light source, a coded member positioned therebetween and movable relative thereto, and means for accurately aligning the photocells and light source with the coded member, including an elongated slot in the member, means for adjusting the photocells relative to one another, and means for adjusting the light source relative to the photocells to provide maximum response of the photocells when the slot is in registry with the photocells.

The invention also contemplates a method for accurately aligning the photocells and light source in a converter with a coded member having an elongated slot therein, comprising positioning the photocells in alignment with one another, positioning the coded member so that the elongated slot is in registry with the photocells, and adjusting the light source relative to the photocells to provide maximum response of the photocells.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

Figure 1:
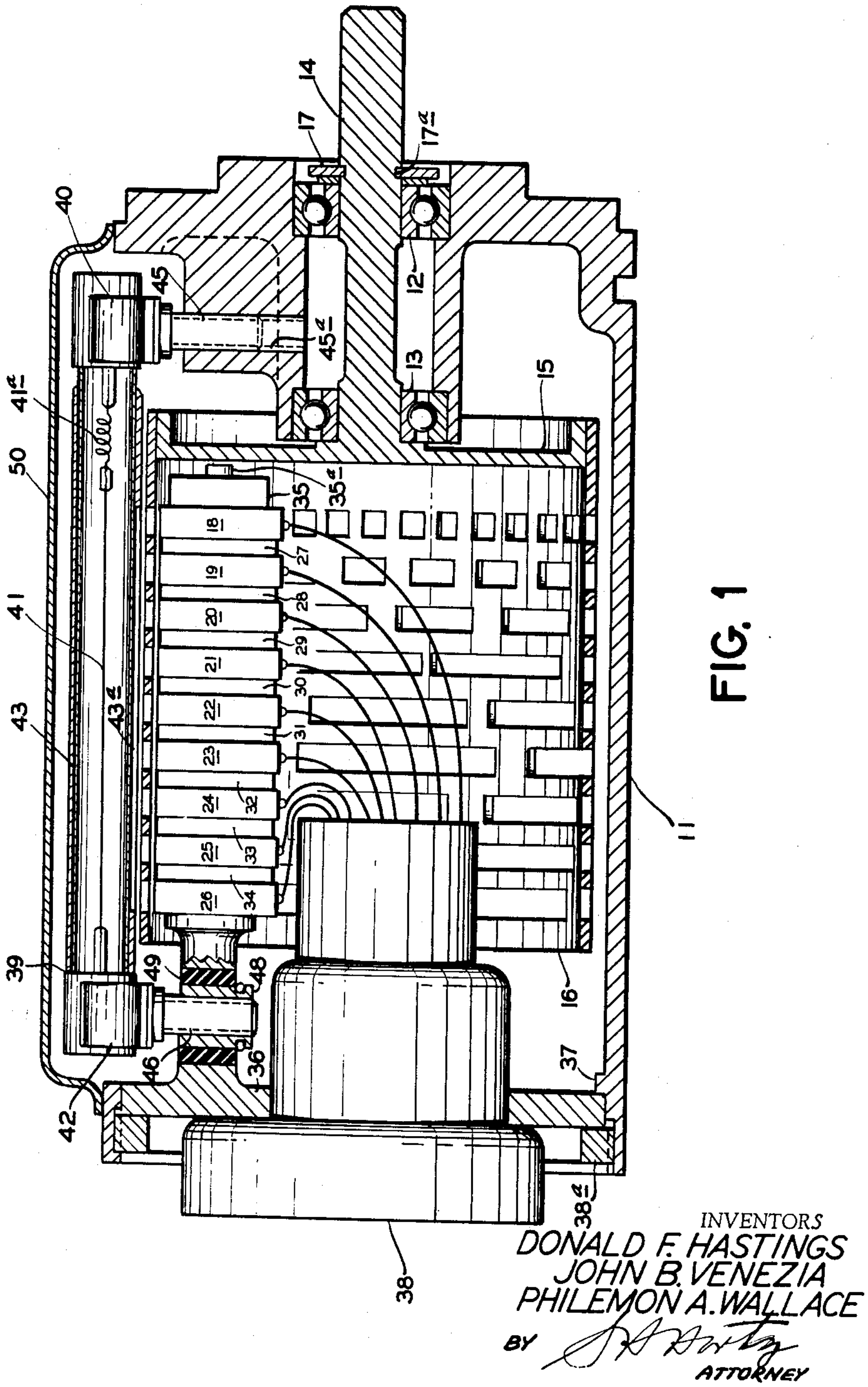
Figure 1 is a cross-sectional view of one embodiment of a data converter constructed according to the invention.
Figure 3:
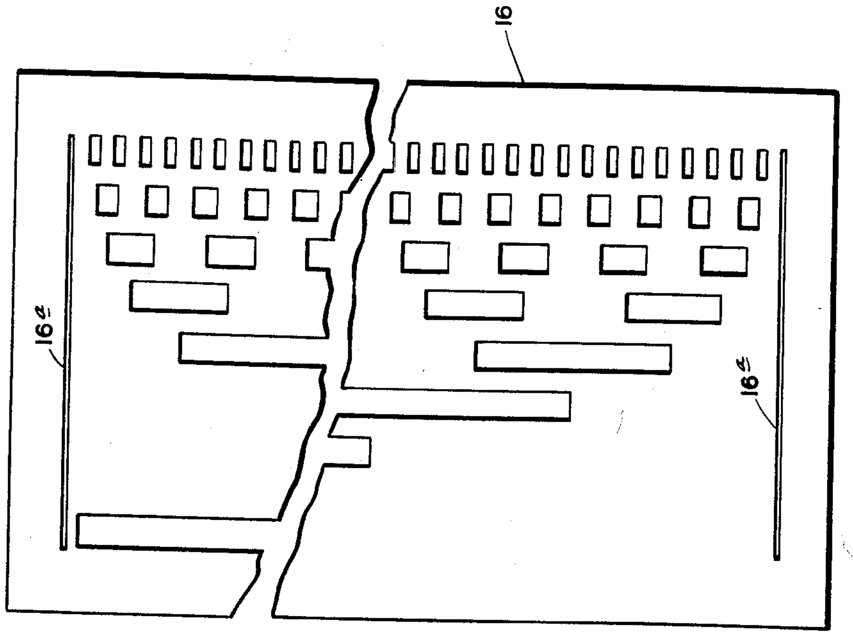
Figure 3 shows the drum in developed form used in the converters.

Referring to the drawings, in Figure 1 is shown a novel data converter, constructed according to the invention, for converting information from one form to another. The converter shown and described may be used for converting analog information to equivalent digital form and may use one of the binary codes. A drum 16 having transparent and opaque portions in the form of a binary code is mounted on a flange 15 integral with a shaft 14 rotatably supported by bearings 12, 13 in a housing 11. A snap ring 17 secured to housing 11 and received in a groove 17a in shaft 14 restrains the shaft from moving axially. Drum 16 may be made of glass or high temperature transparent plastic or metal. If glass or plastic is used, portions on its surface are made opaque in accordance with a binary code, as shown in Figure 3. If the drum is made of metal, portions of the binary code are etched through the metal. The drum of the present arrangement uses nine tracks and the code information extends over 320 degrees.

Figure 4:
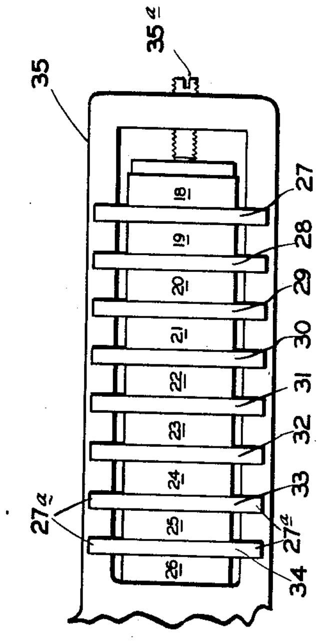
Figures 4 and 5 are detail views showing the manner in which the photocells are adjustably mounted in the converter.

Referring more particularly to Figures 1 and 4, photocells 18 to 26, separated by spacers 27 to 34, are secured by a locking screw 35a in a supporting member 35 extending within the drum and integral with an end piece 36 held in place against a flange 37 of housing 11 by a locking nut 38a. Each spacer has a pair of outwardly extending projections 27a which engage member 35. A connector 38 is secured to end piece 36 and is electrically connected to each of the photocells. The photocells preferably are of the cadmium sulphite photoconductive type so that a low level light source may be used and the cells have a sensitive surface of only a few square millimeters. The cells are positioned so that the sensitive surface is directed toward the drum.

A lamp 39, having a single longitudinal filament 41 supported at one end by a spring 41a to eliminate drooping due to expansion of the filament, is mounted exteriorly of drum 16 in ferrules 40, 42 which provide electrical connections for the lamp. A sleeve 43 is mounted on lamp 39 and the sleeve has a longitudinal slot 43a approximately .005″ wide and at least as long as the illuminated portion of the lamp filament. Sleeve 43 is rotated on lamp 39 until slot 43a is aligned with the entire length of filament 41 and is then secured in place by conventional means, such as by cement. Ferrule 40 is mounted on an adjusting screw 45 received in a tapped hole 45a in housing 11. Ferrule 42 is mounted on an adjusting screw 46 threaded into a bushing 48 mounted in an insulator 49 on member 35. Screws 45, 46 provide for adjusting lamp 39 toward and away from drum 16. The lamp preferably is adjusted as close to the drum as possible without touching the drum. The end of the lamp adjacent to ferrule 40 is grounded to housing 11 and the end of the lamp adjacent to ferrule 42 is insulated from the housing and is connected to connector 38. A lamp housing 50 is secured to housing 11 in any suitable manner and protects the lamp assembly.

As drum 16 rotates it is scanned by a long narrow beam of light from the lamp assembly and energizes the photocells adjacent the transparent portions of the drum as determined by the angular position of the drum. Since the photosensitive area of each photocell is small, each cell must be accurately positioned so that its photosensitive area is properly located with respect to the drum and to the light source. To facilitate aligning the photocells after the spacers and photocells are alternately assembled to supporting member 35, locking screw 35a is set so that the photocells are frictionally held between the spacers, but yet are able to be moved relative to the spacers. Member 35 is placed on a fixture having a flat plate with an aperture approximately .005″ wide as long as the cell bank and perpendicular to end piece 36 and the photocells are positioned in member 35 with one face of each photocell in contact with the plate. With strong room illumination through the aperture, each cell is positioned for maximum sensitivity and after all the cells have been adjusted they are secured in place by tightening locking screw 35*a*. The assembly then is removed from the fixture and assembled to the housing.

It will be observed from Figure 3 that two alignment slots 16*a* substantially .005″ wide are provided in the drum at the ends of the binary code. The slots are sufficiently long so that when they are in registry with the photocells they permit light from lamp 39 to illuminate all the photocells 18 to 26. The drum is rotated until one of the two alignment slots is in registry with the photocells and the lamp is adjusted by rotating it with its shield until each cell shows maximum response. As a precautionary check the drum may then be rotated until the other alignment slot is in registry with the photocells. The arrangement described provides simple, rapid and effective means of accurately aligning the photocells and lamp with the coded drum.

Figure 2:
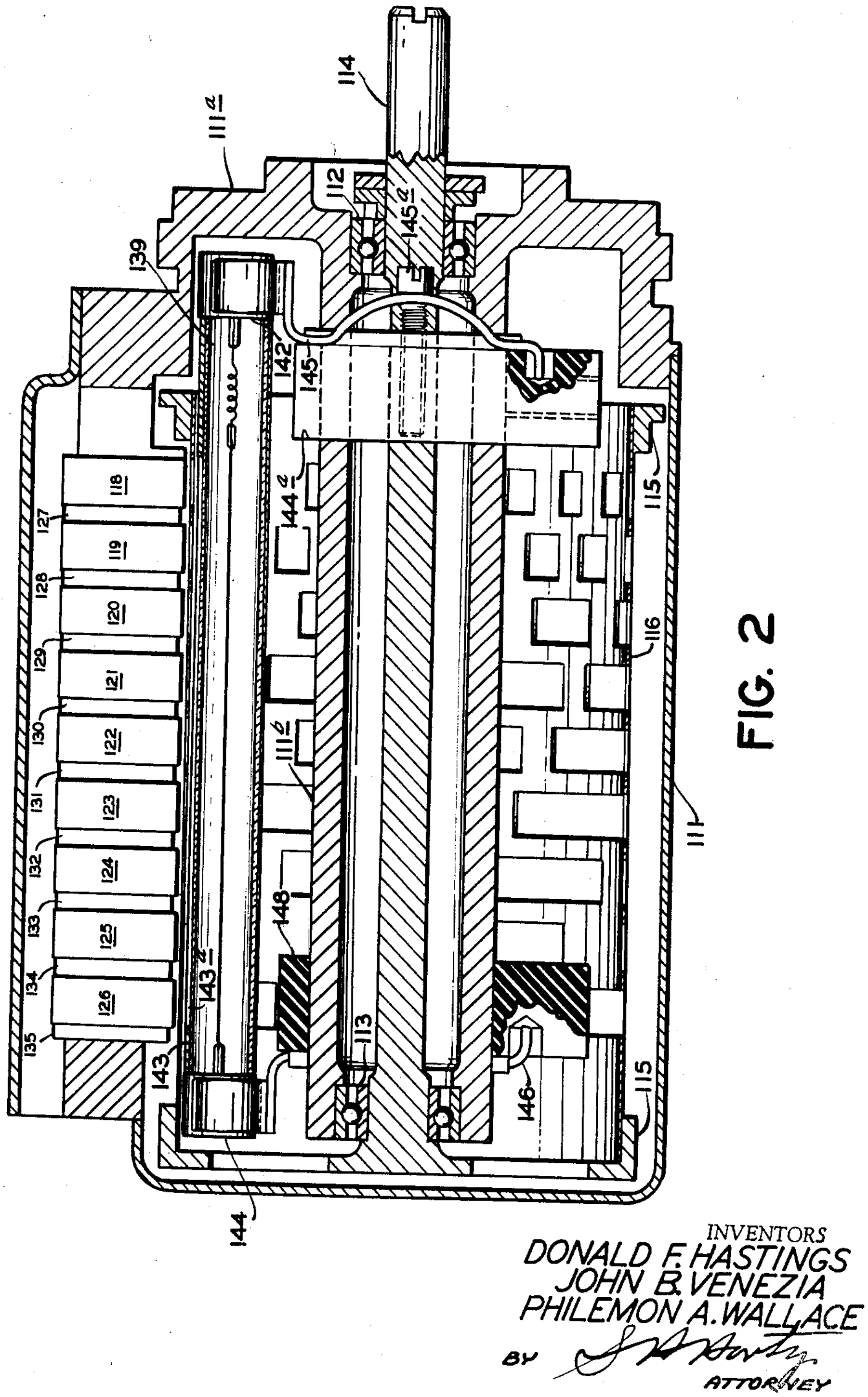
Figure 2 is a cross-sectional view of a second embodiment of the invention.

In Figure 2, another form of the converter is shown in which lamp 139 and sleeve 143 are positoned inside of coded drum 116, and photocells 118 to 126 are positioned exteriorly of the drum. The drum is supported at its ends on flanges 115 fixed to a shaft 114 and rotatably mounted in bearings 112, 113 supported in a sleeve 111*b* integral with an end plate 111*a*. Lamp 139 is mounted in ferrules 142 and 144 fixed to pairs of spring clips 145 and 146 respectively. The spring clips are mounted in bushings 144*a* and 148 secured to sleeve 111*b*. Bushing 114*a* preferably is of electrically conducting material to ground ferrule 142 and bushing 148 is of insulating material to insulate ferrule 144 from the lamp. Ferrule 144 and photocells 118 to 126 may be connected in any suitable manner externally of the converter. The lamp may be adjusted toward and away from the inner surface of drum 116 by screws 145*a* threaded into end plate 111*a* and engaging spring clips 145 The screws 145*a* deflect the spring clips 145 and position the lamp relative to the drum.

Figure 5:
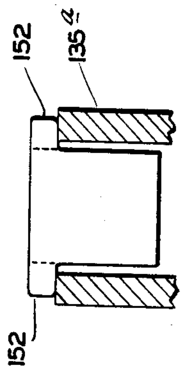

Photocells 118 to 126 are assembled alternately with spacers 127 to 135 in a supporting member 135*a* secured to end plate 111*a* and similar to the arrangement shown in Figure 4. However, in the embodiment of Figure 2, each photocell is cemented to a spacer, preferably with the end of the photocell adjacent the drum flush with the associated surface of the spacer. As shown in Figure 5, the spacers are constructed with projections 152 for engaging supporting member 135*a* and limiting movement of the spacers and photocells toward the drum. The spacers are further constructed so that the body portion is of less width than the opening in member 135*a* so that the spacers and photocells can be moved individually transversely of the member to facilitate alignment of the photocells To make the aligning adjustment in this embodiment, the lamp 139 and sleeve 143 are adjusted relative to one another until the slot 143*a* in the sleeve is aligned with the entire length of the filament and the lamp and sleeve are adjusted until they are positioned as close to the inner surface of the drum as possible without touching the drum. The drum is rotated until the aligning slot 16*a* in the drum is in registry with the photocells, and lamp 139 and sleeve 143 are rotated until the photocells give maximum response. The photocells then are adjusted with respect to the aligning slot 16*a* and lamp by moving each spacer and photocell assembly transversely of member 135*a* until it gives maximum response. The photocells after adjustment are in alignment in planes transversely of one another. It will be observed that in this embodiment the photocells are aligned while the photocells and supporting member are assembled in the converter. After the photocells and spacers are aligned as described above, the spacers are secured to supporting member 135*a* by cement or other suitable means. With this arrangement, screw 35*a* of Figs. 1 and 4 may be eliminated.

In some instances it may be more convenient to use the spacer arrangements of Figure 2 in the embodiment of Figure 1, that is, the photocells may be glued to the spacers as described and the spacers may be constructed for transverse movement and secured by cement to supporting member 35.

The method and structures described provide for rapidly and accurately aligning the light source, the code pattern and the photocells by one relatively inexperienced.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A converter for converting analog information to digital form and having a plurality of photocells, a light source and a coded member positioned therebetween and movable relative thereto, means for accurately aligning the photocells and light source with the coded member including an elongated slot in the member, means for adjusting the photocells relative to one another for aligning the photocells, and means for adjusting the light source relative to the photocells to provide maximum response of the photocells when the slot is in registry with the photocells.

2. A converter for converting analog information to digital form and having a plurality of photocells, a light source and a coded member positioned therebetween and movable relative thereto, means for accurately aligning the photocells and light source with the coded member including an elongated slot in the member, a supporting member mounting the photocells and providing for adjusting the photocells so that the photocells are aligned in planes a right angles to one another, and means for adjusting the light source relative to the photocells to provide maximum response of the photocells when the slot is in registry with the photocells.

3. A converter for converting analog information to digital form and having a plurality of photocells, a light source, a coded member positioned therebetween and movable relative thereto, means for accurately aligning the photocells and light source with the coded member including an elongated slot in the member, the photocells being separated by spacers and being mounted in a supporting member and being individually adjustable for aligning the photocells, and means for adjusting the light source relative to the photocells to provide maximum response of the photocells when the slot is in registry with the photocells.

4. A converter for converting information from one form to another and having a drum with a coded pattern thereon, a plurality of photococells positioned within the drum, a light source positioned exteriorly of the drum, means for accurately aligning the photocells and light source with the coded drum including an elongated slot in the drum, means for adjusting the photocells relative to one another for aligning the photocells, and means for adjusting the light source relative to the photocells to provide maximum response to the photocells when the slot is in registry with the photocells.

5. A converter for converting information from one form to another and having a drum with a coded pattern thereon, a plurality of photocells positioned exteriorly of the drum, a light source positioned within the drum, means for accurately aligning the photocells and light source with the coded drum including an elongated slot in the drum, means for adjusting the photocells relative to one another, and means for adjusting the light source relative to the photocells to provide maximum response of the photocells when the slot is in registry with the photocells.

6. A converter for converting information from one form to another and having a plurality of photocells, a light source, a coded member positioned therebetween and movable relative thereto, means for accurately aligning the photocells and light source with the coded member including an elongated slot in the member, a supporting member for the photocells, spacers positioned between the photocells for separating the photocells from one another and each spacer mounting a photocell and having a pair of projections thereon for mounting the spacer and associated photocell in the supporting member and providing for individually adjusting the photocells relative to the slot in the coded member, and means for adjusting the light source relative to the photocells to provide maximum response of the photocells when the slot is in registry with the photocells.

References Cited in the file of this patent

UNITED STATES PATENTS

| | | |
|---|---|---|
| 1,886,188 | Hough | Nov. 1, 1932 |
| 2,320,977 | Nicolson | June 1, 1943 |
| 2,432,303 | Fox | Dec. 9, 1947 |
| 2,561,869 | Kent | July 24, 1951 |